United States Patent [19]

Durenec

[11] 4,049,149
[45] Sept. 20, 1977

[54] FREIGHT CONTAINER UNIVERSAL CORNER

[75] Inventor: Peter Durenec, Annandale, Va.

[73] Assignees: William Brener, Annandale; Edward Ball; Floyd Branan, both of Bailey's Crossroads, all of Va.; a part interest to each

[21] Appl. No.: 634,744

[22] Filed: Nov. 24, 1975

[51] Int. Cl.² .................. B65J 1/02; B65D 21/02
[52] U.S. Cl. .................... 220/1.5; 24/81 E; 220/23.4; 296/35 A
[58] Field of Search .................. 220/1.5, 23.4; 296/35 A; 105/366 B, 366 E; 24/221 RC, 81 E; 294/67 D, 67 DA, 67 DB, 67 DC; 214/10 SR

[56] References Cited

U.S. PATENT DOCUMENTS

| | | | |
|---|---|---|---|
| 2,930,091 | 3/1960 | Imparato | 24/81 E |
| 3,317,219 | 5/1967 | Hindin et al. | 296/35 A |
| 3,363,803 | 1/1968 | Abolins | 220/23.4 |
| 3,365,229 | 1/1968 | Hitch et al. | 220/23.4 |
| 3,456,829 | 7/1969 | Glassmeyer | 220/1.5 |
| 3,578,374 | 5/1971 | Glassmeyer | 24/81 E |
| 3,836,043 | 9/1974 | Levin | 206/504 |

Primary Examiner—William Price
Assistant Examiner—Allan N. Shoap
Attorney, Agent, or Firm—Cushman, Darby & Cushman

[57] ABSTRACT

An improved universal corner for freight containers which reduces the cost and simplifies the procedures of constructing freight containers. The corner fitting is designed such that it will form every corner of the container while simultaneously providing means essential for allowing the container to be lifted or coupled to other containers or to surfaces such as decking on ships or the ground.

8 Claims, 6 Drawing Figures

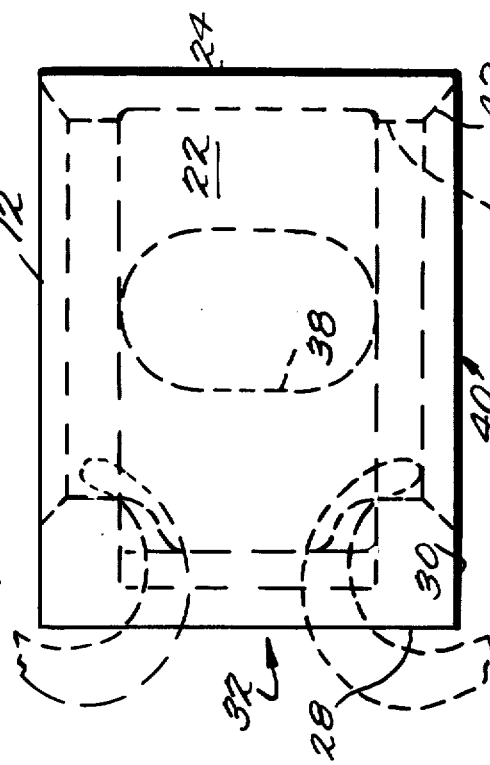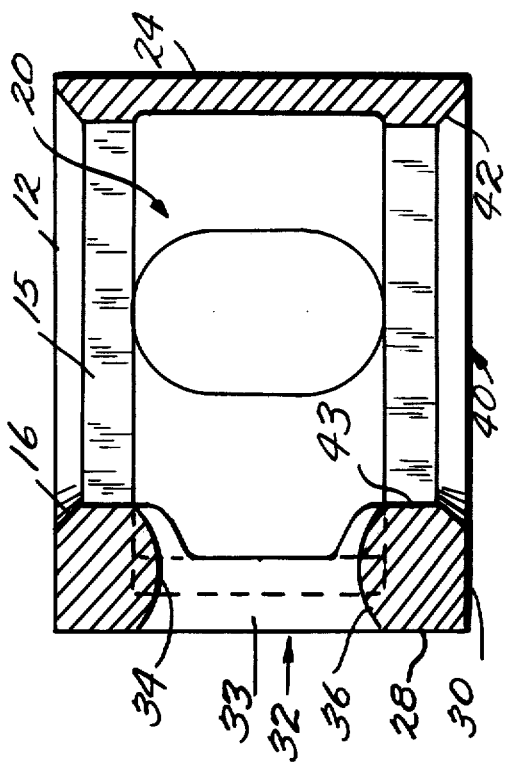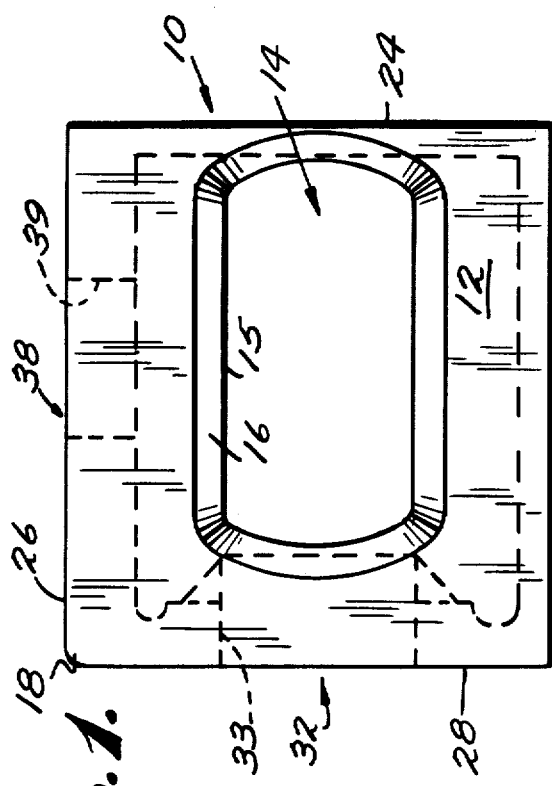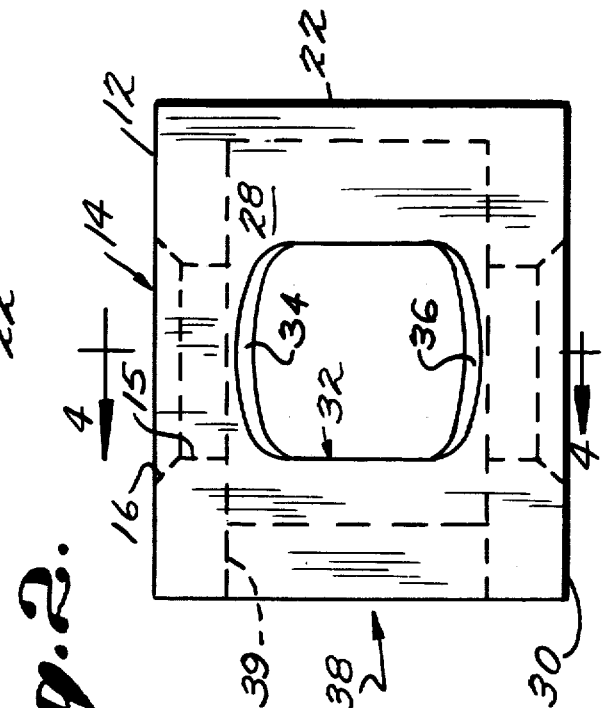

FREIGHT CONTAINER UNIVERSAL CORNER

BACKGROUND OF THE INVENTION

This invention relates to an improved corner member which is particularly adapted for use with freight containers and more specifically with containerized cargo containers. This corner member provides the container with the means which allow the container to be lifted or coupled to other containers or secured to surfaces such as ships deck, the floor of a railroad car or the ground.

Such containers are commonly in use for hauling freight by ship, rail or air wherein the shipping container itself could form the body portion of a vehicle or the means for holding and stacking material being hauled within vehicles.

A system for handling, securing and lifting such containers is discussed in U.S. Pat. No. 3,042,227. This patent discloses apparatus for transferring freight containers of the type referred to herein into the hold of a ship for transportation to a desired location. In such a transfer system, a crane or other suitable lifting mechanism is lowered into position over the cargo container and is removably coupled to the container. Thereafter, the container can be lifted or transferred as is necessary.

The disclosed mechanism for removably coupling the lifting mechanism to the container consists of at least a pair of twist lugs which are attached to the lifting mechanism and which fit into suitably designed sockets located in the container. However, the patent contains no disclosure as to the design of that portion of the container which receives the twist lug. In practice, however, containers of the type referred to in U.S. Pat. No. 3,042,227 have one key slot type opening in the top face of the container at each corner into which twist lugs fit.

When constructed in this fashion, the container, while being liftable by twist lug elements, cannot be easily lifted by a conventional lifting hook nor can containers be easily coupled vertically or horizontally.

An example of a socketed corner member designed for containers is disclosed in U.S. Pat. No. 2,963,310, a substantially rectangular recess which opens through the upper face of the corner member via a generally rectangular opening of a size suitable to receive a twist lug.

Several different embodiments are shown in U.S. Pat. No. 2,963,310 and each of the corners is fitted with a similar corner member having only one hole in the upper wall for the top corners or one hole in the bottom wall for the bottom corners. The container could be picked up, secured to the ground or a deck or secured to a container either directly above or directly below. No coupling, however, can be effected from a horizontal direction and requires the use of separate spacing devices such as vertical spacer beams.

More recently, containers of the type referred to herein have been provided with corner members which would allow for both vertical and horizontal coupling. However, such corner members have suffered from the problem that one corner member would not fit on each corner of the container and provide the essential coupling requirements. Thus, at least two separately designed corner member elements would have to be used in order to provide the proper lifting and/or coupling means. This required that each type of corner member be inventoried and that the proper corner member for the respective corner be used during assembly of the container since use of the wrong corner would make that particular section of the container unusable.

SUMMARY OF THE INVENTION

The invention consists of a generally rectangular-shaped hollow coupling block having four entry ports provided therein and which is usable to form each corner of a shipping container. The coupling block, in addition, has two solid wall members which always serve as two of the three interior walls through which the coupling block is secured to the shipping container. The third wall will vary between the block's top and bottom walls, as described hereinafter, depending on which corner is being assembled.

Further, the coupling block has been designed so that when in use with any of the corners of the shipping container, one of the openings will always face toward the end of the container while a second one of the openings will always face toward the side of the container.

The opening which always faces toward the end of the container is defined by wall portions whose upper and lower surfaces suitably are rounded across their width so that lifting means will be able to completely engage the lifting surface provided thereby equally spacing the load forces applied thereto and to further prevent damaging the lifting device.

The invention will become more apparent as the following description proceeds in conjunction with the accompanying drawings, wherein:

FIG. 1 is a top view of the coupling block;
FIG. 2 is a front view of the coupling block;
FIG. 3 is a side view of the coupling block;
FIG. 4 is a sectional view taken along line 4—4 of FIG. 2.
FIG. 5 is a side view showing four shipping containers and one corner of each containing the universal corner coupling block; and
FIG. 6 is a perspective view of a plurality of stacked containers coupled together.

DETAILED DESCRIPTION

Figure 5:
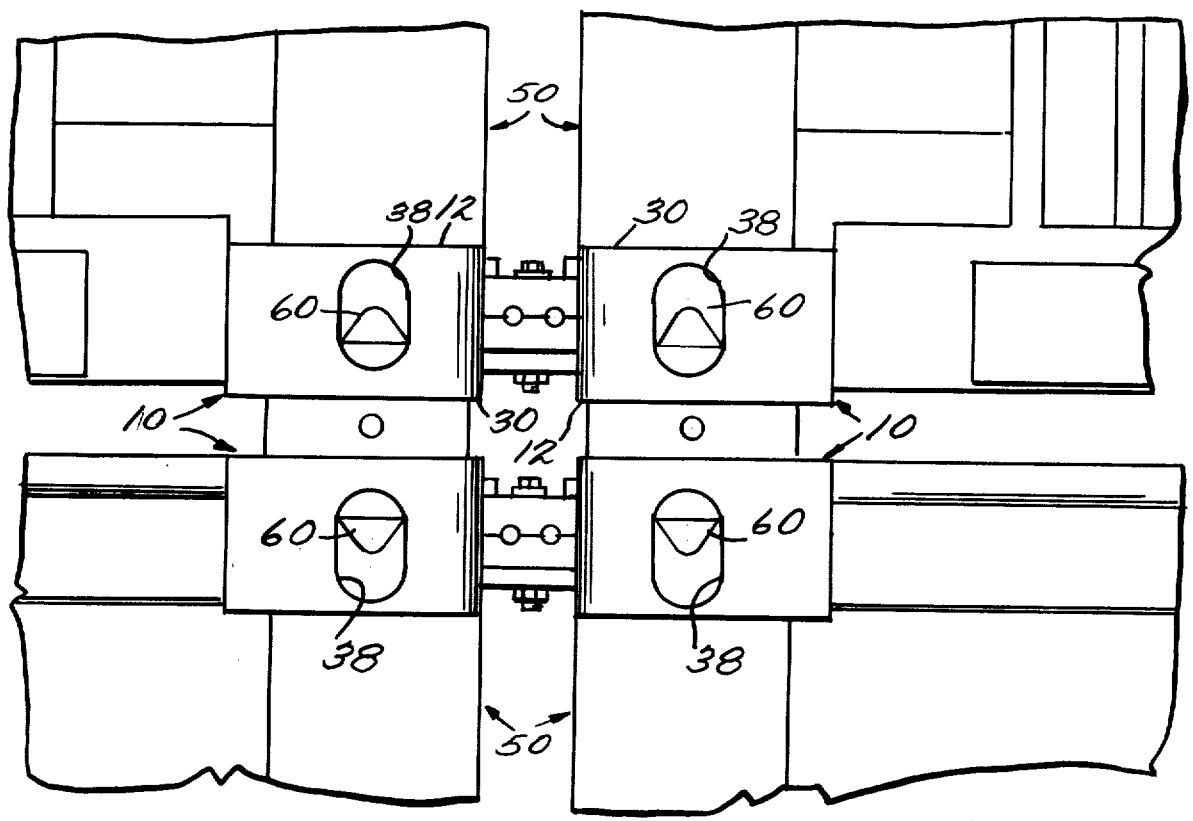

Specific reference is now made to the above drawings wherein similar reference characters are used for corresponding elements throughout.

Attention is initially directed to FIG. 1 which shows universal coupling block 10 from the upper wall 12 thereof. Located within the upper wall 12 is a generally rectangular opening 14, which is defined by side walls 15, the exterior edges 16 being angled or beveled so as to provide a convenient entry surface for coupling means such as twist lugs (not shown) that may be inserted through opening 14.

The interior of block 10 comprises a generally rectangular recess 20 bounded by the upper wall 12, by side walls 22, 24, 26, 28 and by bottom wall 30.

Side walls 22 and 24 are solid and provide the primary surfaces usable for attaching coupling block 10 to a suitable shipping container 50 as shown in FIG. 5.

Depending upon which corner is being formed, either upper wall 12 or lower wall 30 will be the third surface used for attaching the coupling block 10 to the shipping container 50. However, block 10 has one exterior corner 18 which is rounded and will always form the outer corner when block 10 is secured in place.

In all mounting instances, end wall 28 will become a portion of the end of the shipping container so that generally rectangular opening 32 located in wall 28 will face toward the end of the container 50 and provide another opening into recess 20. As seen in FIGS. 3 and 4, opening 32 is defined by side walls 33 whose top and bottom shoulders 34 and 36, respectively, are rounded across their width so as to provide as large a contact surface as is possible for lifting means shown in phantom in FIG. 3. Both shoulders are rounded so that the same lifting surface is provided regardless of whether upper wall 12 or bottom wall 30 is attached to container 50. In addition, the rounding of these wall portions will reduce the possibility of damage occurring to either the coupling block or to the lifting means.

Attention is next directed to FIG. 3 and opening 38 defined by walls 39 and located in side wall 26 which opens into recess 20. The edges of the walls defining this opening are not shown as being rounded or beveled but it is within the contemplation of this invention that they could be beveled or rounded if that was thought to be desirable.

Attention is next directed to FIG. 4 and to bottom wall 30 which has a substantially rectangular opening 40 located therein which is in axial alignment with opening 14 in upper wall 12, and also opens into recess 20. The exterior edges of the side walls 43 which define opening 40 are beveled or angled as at 42 so as to provide a means for smoothing the entry of coupling members (not shown) through said opening.

FIG. 5 shows a side view of a plurality of containers and specifically one corner of each employing coupling blocks 10 and how coupling between containers is effected. Coupling means such as twist lugs 60 are used to secure containers 50 together both horizontally and vertically. Further, it is clearly shown how upper wall 12 and bottom wall 30 are attached to container 50 depending upon which corner of the container is being considered. In those instances where wall 12 or 30 is secured to the container, it is of course understood that the respective openings in that wall attached to container 50 will not be used.

Figure 6:
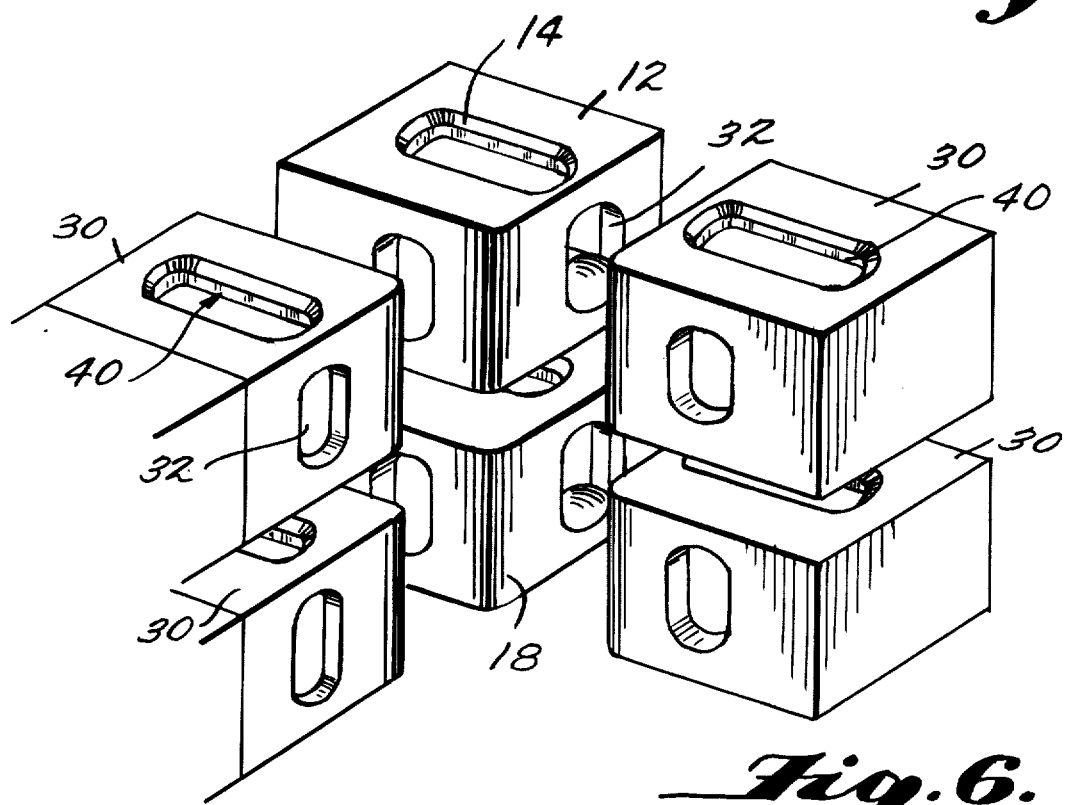

As is evident from FIG. 6, openings 14, 32, 38 and 40 allow for a great deal of flexibility for coupling shipping containers together both vertically and horizontally regardless of the corner which contains block 10. Thus, a large pile of shipping containers can be given lateral stability without the requirement of external support as disclosed in U.S. Pat. No. 2,963,310 when stacking large numbers of shipping containers.

Prior art devices referred to hereinabove have recognized the desirability of having vertical and horizontal coupling capabilities but not the multipurpose coupling block described herein which can be used on any corner of the shipping container while providing all the described coupling requirements for such corner members.

A variety of materials has been found to be suitable for purposes of constructing the present invention such as aluminum, steel, cast iron and in certain situations, synthetic materials such as polyethylene, nylon or other thermoplastic materials could be used. Further, a variety of attaching methods has been found suitable, of which welding, soldering or any other bonding technique such as adhesives which will permanently attach the coupling block to the container are examples.

While a preferred embodiment of the present invention has been shown and described herein, skilled artisans may make minor variations without departing from the spirit of the invention and the scope of the appended claims.

What is claimed is:

1. An improved corner coupling for forming each corner of a shipping container comprising: a substantially rectangular block having a top wall, a bottom wall and four sidewalls defining around a hollow interior area, one of said four sidewalls being a rear wall, a second of said four sidewalls being a front wall positioned opposite said rear wall, a third of said sidewalls being an interior wall and the fourth of said sidewalls being an exterior wall positioned opposite from said interior sidewall, two adjacent ones of said four sidewalls being solid, said rear wall being one of said solid walls and said interior wall being the other solid wall, the other two adjacent ones of said four sidewalls including means defining an opening therein extending therethrough, said front wall being one of said sidewalls having an opening therein and said exterior wall being the other sidewall having an opening therein, means defining generally rectangular openings extending through said top and bottom walls leading therethrough into the hollow interior of said block, said openings in said top and bottom walls being substantially identical and in axial alignment, wall portions defining upper and lower edges of said openings within the other two adjacent sidewalls, said wall portions being rounded across their width from the exterior to the interior so as to provide a lifting surface for distributing loads placed thereon so that when said corner coupling is positioned in place, regardless of which corner is being formed, whereby said front wall will always face toward the end of the shipping container and said solid walls will always form two of the interior walls through which the coupling is secured to the shipping container.

2. An improved corner coupling as claimed in claim 1 wherein said block is aluminum.

3. An improved corner coupling as claimed in claim 2 wherein said block is permanently attached to said container.

4. An improved corner coupling as claimed in claim 1 wherein said block is steel.

5. An improved corner coupling as claimed in claim 4 wherein said block is permanently attached to said container.

6. An improved corner coupling as claimed in claim 1 wherein said block is constructed of a thermoplastic material.

7. An improved corner coupling as claimed in claim 6 wherein said block is permanently attached to said container.

8. A shipping container having corner members secured thereto wherein each of said corner members is of identical construction, said container comprising: bottom, top and sidewalls connected together so as to form a generally rectangular container, socket means in the corners of said container for receiving lifting and coupling means wherein each of said lifting and coupling means comprises a substantially rectangular block having a top wall, a bottom wall and four sidewalls defining around a hollow interior area, one of said four sidewalls being a rear wall, a second of said four sidewalls being a front wall positioned opposite said rear wall, a third of said sidewalls being an interior wall and the fourth of said sidewalls being an exterior wall positioned opposite from said interior sidewall, two adjacent ones of said four sidewalls being solid, said rear wall being one of said solid walls and said interior wall being the other solid wall, the other two adjacent ones of said four sidewalls including means defining an opening therein extending therethrough, said front wall being one of said sidewalls having an opening therein and said exterior wall being the other sidewall having an opening therein, means defining generally rectangular openings extending through said top and bottom walls leading therethrough into the hollow interior of said block, said openings in said top and bottom walls being substantially identical and in axial alignment, wall portions defining upper and lower edges of said openings within the other two adjacent sidewalls, said wall portions being rounded across their width from the exterior to the interior so as to provide a lifting surface for distributing loads placed thereon so that when said corner coupling is positioned in place, regardless of which corner is being formed, whereby said front wall will always face toward the end of the shipping container and said solid walls will always form two of the interior walls through which the coupling is secured to the shipping container.

* * * * *